No. 643,337. Patented Feb. 13, 1900.
F. SOCHUREK, Sr.
WASHING APPARATUS FOR FILTERING MATERIALS.
(Application filed Nov. 27, 1899.)
(No Model.) 2 Sheets—Sheet 1.
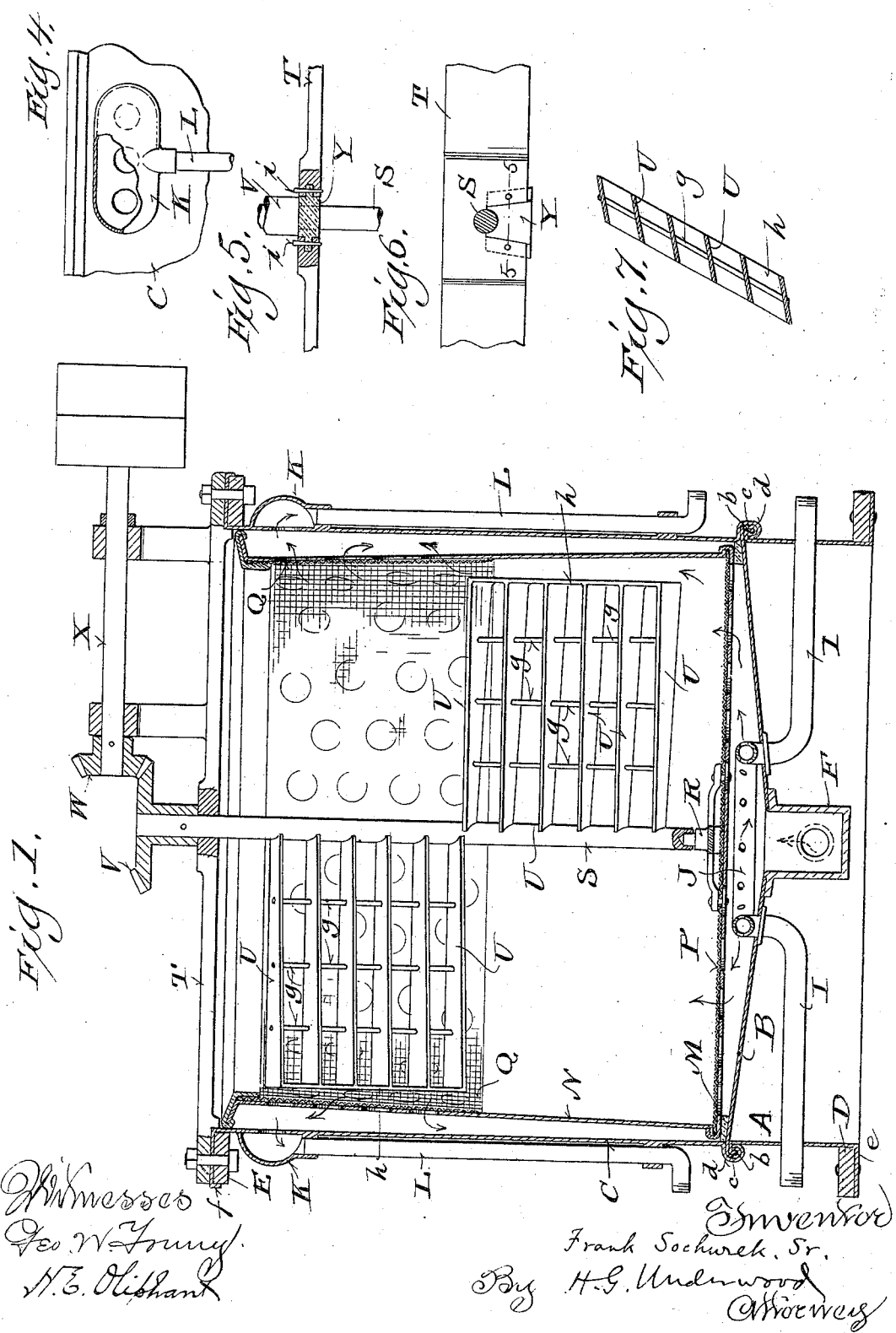
Witnesses
Geo. W. Young.
N. E. Oliphant
Inventor
Frank Sochurek, Sr.
By H. G. Underwood No. 643,337. Patented Feb. 13, 1900.
F. SOCHUREK, Sr.
WASHING APPARATUS FOR FILTERING MATERIALS.
(Application filed Nov. 27, 1899.)
(No Model.) 2 Sheets—Sheet 2.

Witnesses:
Geo. W. Young.
N. E. Oliphant.

Inventor
F. Sochurek, Sr.
By H. G. Underwood
Attorneys

THE NORRIS PETERS CO., PHOTO-LITHO., WASHINGTON, D. C.

UNITED STATES PATENT OFFICE.

FRANK SOCHUREK, SR., OF MILWAUKEE, WISCONSIN.

WASHING APPARATUS FOR FILTERING MATERIALS.

SPECIFICATION forming part of Letters Patent No. 643,337, dated February 13, 1900.

Application filed November 27, 1899. Serial No. 738,302. (No model.)

*To all whom it may concern:*

Be it known that I, FRANK SOCHUREK, Sr., a citizen of the United States, and a resident of Milwaukee, in the county of Milwaukee and State of Wisconsin, have invented certain new and useful Improvements in Washing Apparatus; and I do hereby declare that the following is a full, clear, and exact description thereof.

My invention has for its object to provide simple, economical, convenient, and durable machines for cleansing filtering material, particularly such as is used in breweries; and it consists in certain peculiarities of construc15 tion and combination of parts hereinafter specified, with reference to the accompanying drawings, and subsequently claimed.

Figure 3:
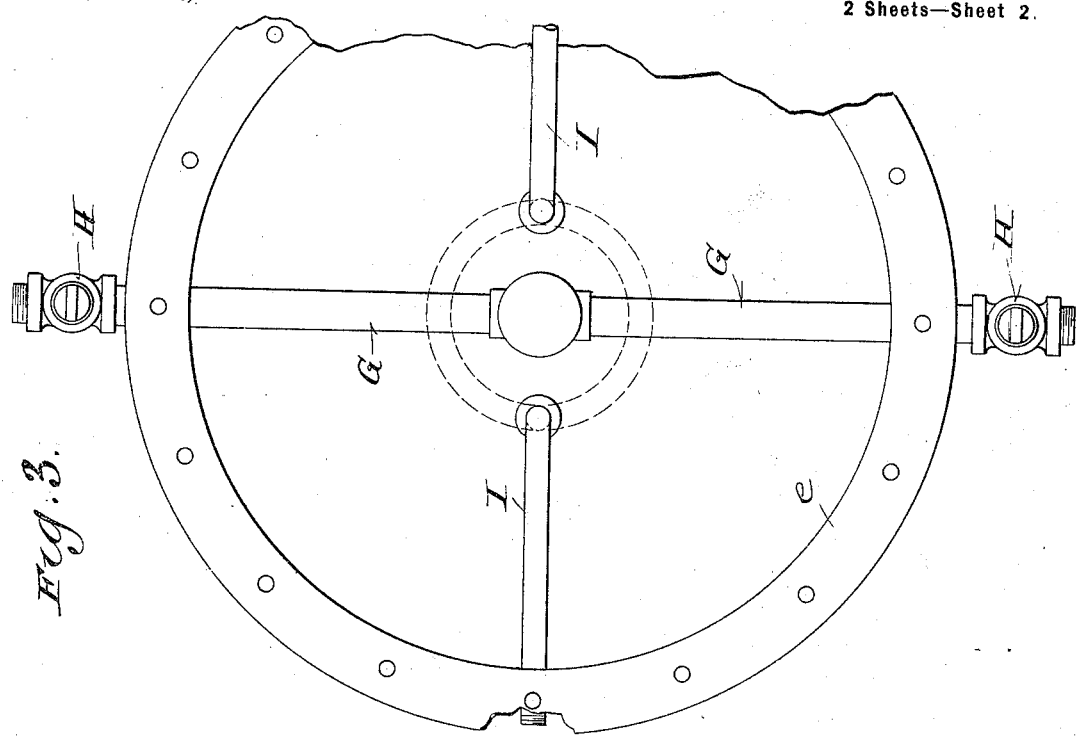
Figure 2:
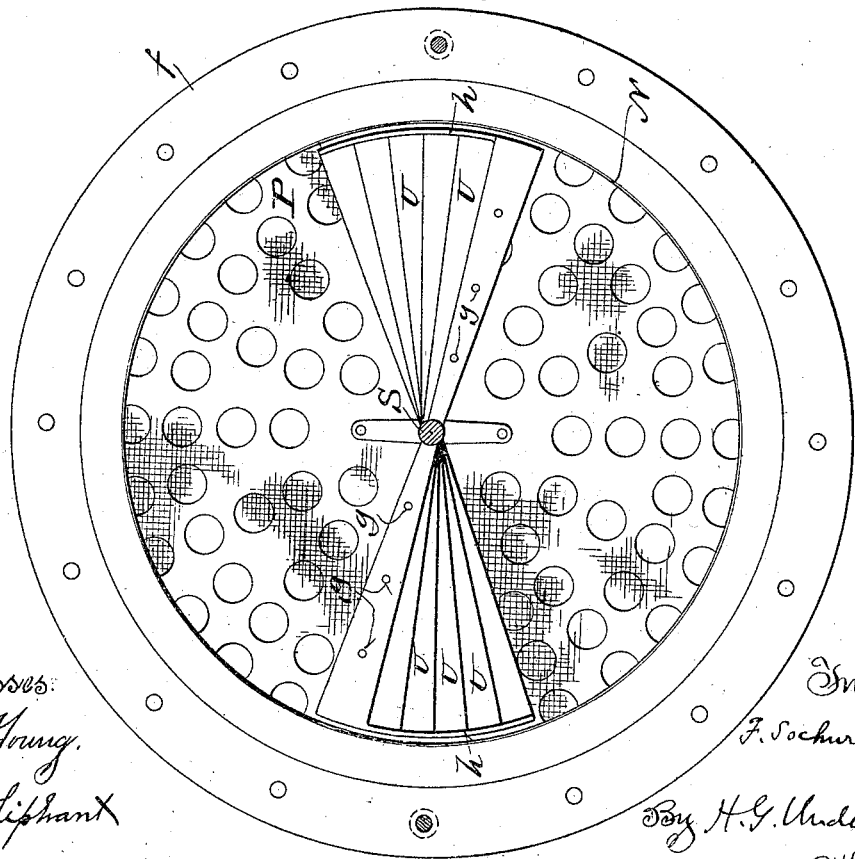

Figure 1 of the drawings represents a vertical transverse sectional view of a machine made in accordance with my invention; Fig. 2, a plan view of the machine with parts thereof in horizontal section; Fig. 3, a plan view of the tank portion of said machine inverted and broken; Fig. 4, a partly-broken detail elevation illustrating an overflow of the tank; Figs. 5 and 6, detail views illustrating means whereby the removable stirrer of the machine is held in its upper bearing, the first of this brace of figures being partly in section on the plane indicated by line 5 5 in the other of said figures; and Fig. 7, a detail sectional view of a wing of the stirrer.

Referring by letter to the drawings, A indicates the lower section, B the dished bot35 tom, and C the upper section, of a cylindrical sheet-metal tank. In the manufacture of the tank a continuous primarily horizontal upper outer flange $b$ of the lower section A is caught in a continuous edge fold $c$ of the bot40 tom B, and a continuous primarily horizontal lower outer-fold flange $d$ of the upper section C embraces the former fold, in which the flange of said lower section is caught, this union being made permanent and water-tight by bending down of the same to form the outside seam. (Shown in Fig. 1.) The lower tank-section A is provided with a horizontal outer flange $e$, on which a ring D is made fast against the wall of said tank, and a similar ring E is made fast under a horizontal top flange $f$ of the upper tank-section C, these rings serving to stiffen the tank.

By the above-described construction and arrangement of parts I provide a very strong and durable all-metal tank in an economical manner, particular attention being called to the seam union of the bottom with the sections that go to make up the wall of said tank.

Central of the tank-bottom is a depending annular open-top chamber F in union with horizontal pipes G, that extend through the annular wall of the lower section of the tank and are provided at their outer ends with cocks H for connection with a water-supply system. A pair of other pipes I, extending through the lower section of the tank wall and bottom, are in diametrically opposite connection with a perforated tubular ring J, these latter pipes and the ring being for employment with a source of steam-supply. At intervals of its circumference, near the upper end, the tank is provided with overflow-chambers K, to which drain-pipes L are connected.

A preferably soft-metal gasket M is laid in on the bottom of the tank against the wall, this gasket serving to protect the above-described seam, and set in said tank on said gasket is a sheet-metal receptacle N for filtering material, this receptacle being shown as preferably gradually contracted in an upward direction and made flaring at its upper end to fit snug in said tank. The receptacle has a perforated bottom covered with sieve material P, preferably seamed therewith to the wall of said receptacle, the upper portion of this wall being also perforated and lined with sieve material Q, held in place by suitable means.

Made fast in the receptacle, central of its bottom, is a bearing R for a vertical shaft S, that has its upper bearing in a cross-bar T, bolted at its ends to the upper flange and stay-ring of the tank. Extending from the shaft in opposite directions and at different elevations are wings, each comprising a series of inclined taper blades U, widest at their outer ends, a series of brace-rods $g$, connecting the blades, and a stay-piece $h$, joined to the outer ends of said blades. The shaft and its wings constitute a stirrer, the upper end of said shaft being rigid with a beveled gear-wheel V, in mesh with a bevel-pinion W, fast on one end of a horizontal shaft X, mounted in bearings on the cross-bar T, this latter shaft being provided with fast and loose pulleys for a driving-belt.

In order that the stirrer may be removed from the above-described receptacle without displacing the cross-bar T, this cross-bar is made to receive a flanged slide Y, that constitutes part of the upper bearing for shaft S, this slide being held in place by means of keys i, that lock its flanges in the guide-grooves provided in said bar.

The filtering material to be cleansed is placed in the receptacle N and subjected to steaming and washing operations, the mass being kept in agitation by the stirrer, the shape and disposition of the stirrer-blades being such as to readily cut through said mass, whereby the best results are obtained. The cross-bar T and the stirrer being removed, the receptacle N, with its contents, may be lifted out and dumped; but if more convenient the slide Y may be withdrawn to permit removal of said stirrer without disturbing said cross-bar, after which the contents of said receptacle may be taken out by any suitable means.

Having thus described my invention, what I claim as new, and desire to secure by Letters Patent, is—

1. A machine for cleansing filtering material, the same consisting of a tank, a receptacle in the tank having a sieve-lined perforated bottom and upper wall portion, a stirrer rotative in the receptacle, and means for the discharge of steam and water in said tank under said receptacle.

2. A machine for cleansing filtering material, the same consisting of a tank provided with lower steam and water inlets as well as upper overflows, a receptacle in the tank having a sieve-lined perforated bottom and upper wall portion, and a stirrer rotative in the receptacle.

3. A machine for cleansing filtering material, the same consisting of a cylindrical sheet-metal tank comprising a lower section, a bottom and an upper section seamed together, a receptacle in the tank having a sieve-lined perforated bottom and upper wall portion, a stirrer rotative in the receptacle, and means for the discharge of steam and water in said tank under said receptacle.

4. A machine for cleansing filtering material, the same consisting of a cylindrical sheet-metal tank having upper and lower horizontal outer flanges, stay-rings secured to the flanges against the tank-wall, a receptacle in the tank having a sieve-lined perforated bottom and upper wall portion, a stirrer rotative in the receptacle, and means for the discharge of steam and water in said tank under said receptacle.

5. A machine for cleansing filtering material, the same consisting of a tank, a perforated tubular ring central in the tank next its bottom, steam-pipes in connection with the ring, an open-top chamber depending from the tank-bottom central of the same, water-pipes in connection with the chamber, a receptacle in the tank having a sieve-lined perforated bottom and upper wall portion, and a stirrer rotative in the receptacle.

6. A machine for cleansing filtering material, the same consisting of a tank, a receptacle in the tank having a sieve-lined perforated bottom and upper wall portion, means for the discharge of steam and water into said tank under the receptacle, and a stirrer in said receptacle comprising a rotative shaft, inclined taper blades extending in series from the shaft in opposite directions at different elevations of the same the blades being widest at their outer ends, a series of brace-rods connecting the blades in each series, and a stay-piece joined to the outer ends of said blades.

7. A machine for cleansing filtering material, the same consisting of a tank, a receptacle in the tank having a sieve-lined perforated bottom and upper wall portion, a bearing on the bottom of the receptacle central of same, a stirrer that consists in part of a shaft supported by said bearing, a cross-bar on the tank provided with a separable bearing for said shaft, and means for driving the shaft.

8. A machine for cleansing filtering material, the same consisting of a tank, a receptacle in the tank having a sieve-lined perforated bottom and upper wall portion, a bearing on the bottom of the receptacle central of same, a stirrer that consists in part of a shaft supported by said bearing, a cross-bar supported on the tank made to receive a flanged slide constituting part of the upper bearing for the shaft, keys for locking the slide-flanges in guide-grooves provided in the cross-bar, and means for driving said shaft.

In testimony that I claim the foregoing I have hereunto set my hand, at Milwaukee, in the county of Milwaukee and State of Wisconsin, in the presence of two witnesses.

FRANK SOCHUREK, Sr.

Witnesses:
N. E. OLIPHANT,
B. C. ROLOFF.